3,271,323
SILICATE MINERALS HAVING INCREASED SURFACE AREA AND ABSORPTION PROPERTIES AND METHOD OF PREPARATION THEREOF
Osgood J. Whittemore, Jr., Princeton, Mass., assignor to Norton Company, Worcester, Mass., a corporation of Massachusetts
No Drawing. Filed Apr. 3, 1961, Ser. No. 100,031
16 Claims. (Cl. 252—432)

This invention relates to the treatment and improvement of naturally occurring silicate minerals. More particularly, this invention relates to improved porous ceramic material having high surface area and to a method of manufacturing the same.

The structure and properties of the silicate minerals are determined by the manner in which the continuity of the silica tetrahedra ($SiO_4$) is spread throughout the structure. The Si—O bond is the strongest in the structure and the oxygen atom has the largest radius, so that the manner of arrangement of the skeleton of silicon and oxygen atoms determines the number and position of the basic cations which complete the crystal. Although the terms "orthosilicate" and "metasilicate" are often used for compounds that can be referred to as the hypothetical acids $H_4SiO_4$ and $H_2SiO_3$, the silicates are not salts of various silicic acids, and their structures are not consistent with a derivation from such acids. The complexity of the possible structures is increased by the possibility of replacement of some silicon atoms by aluminum atoms with consequent change in the ratio of silicon to oxygen and resultant alteration in the number of basic atoms required to satisfy the valence rules. The various silicate compounds may be grouped according to the type of Si—O network and the scheme of nomenclature usually followed classifies the silicates into six groups. The nesosilicates are composed of minerals which have separate $SiO_4$ groups in which the four oxygen atoms surrounding a silicon atom are not linked to any other silicate atom. Hence, each oxygen has an unsatisfied valency of −1 which must be satisfied with basic atoms. This group is represented by zircon. The inosilicates have Si—O chains and often develop in long flexible fibers such as in amphibole asbestos. The phyllosilicates are characterized by the presence of Si—O sheets formed by the linkage of three corners of each $SiO_4$ tetrahedron to neighbors, so that each tetrahedron has three shared and one free oxygen. This group contains the majority of the hydrosilicates and is represented by the clay minerals, talc, prophyllite and chrysotile, a fibrous mineral which is a common form of asbestos.

The tectosilicates are characterized by a continuous framework of linked tetrahedra. Some of the quadrivalent silicon atoms are replaced by aluminum which necessitate the incorporation into the structure of metallic cations to satisfy the valence rules. The feldspars are representative of this group as is petalite. The sorosilicates, or group silicates are of a relatively small number and have two $SiO_4$ tetrahedra linked together to form $Si_2O_7$ groups. Finally, the cyclosilicates or ring silicates, have rings formed by the linking together of several $SiO_4$ tetrahedra. Wollastonite is an example of this group.

The hydrosilicates are an important group of the silicate minerals and are largely represented by the clay minerals. Clays as they occur in nature are rocks, consolidated or unconsolidated, that are usually composed of one or more of the clay minerals (hydrosilicates of aluminum, iron or magnesium) with or without other rock and mineral particles. Clays are characterized usually by extreme fineness of particles, often colloidal in size, and by wide variations in physical and ceramic properties and in mineral and chemical compositions.

Clays of these various properties and compositions and the various hydrosilicate earths are useful in many capacities, for example, as catalysts, catalyst carriers, and absorbents. For these purposes the clays and earths are acid treated, shaped into solid agglomerates, dried and fired at temperatures below those at which vitrification will occur.

Porosity and absorption of the fired hydrosilicates are important properties of ceramic materials. Porosity is the volume of pores in the clay or earth referred to the volume of material. Absorption is a determination of the pore space that may be filled by water or other fluid and is expressed in terms of weight. Both properties are a function of the hydrosilicate and the temperature treatment it has received.

Hydrosilicates which have been shaped into agglomerates and fired in the above manner suffer somewhat from a decrease in porosity and absorption. As a result of this factor, they have lost preference in some processes for which they are seemingly well suited. For example, in the field of hydrocarbon conversion, synthetic gels have been produced which have greatly improved properties as catalysts over fired clays. However, these gels are priced at over twice the amount of the clay materials. Also, silicate minerals other than the hydrosilicates have not been considered as possible sources of catalysts, catalyst supports or absorbents since their natural porosity and absorption are comparatively very low.

It is therefore an object of this invention to provide a silicate mineral in a strong fired form having high surface area and absorption.

It is another object of this invention to provide such a product which is especially suitable for use as a catalyst, catalyst carrier, absorbent, etc.

It is still another object of this invention to provide such a product from natural silicate minerals, said product having properties equal to or greater than synthetic materials yet being more easily and economically produced.

It is a further object of this invention to provide a method for the production of silicate minerals in a form having improved surface area and absorption.

It is a still further object of this invention to provide such a method in which readily available and economical raw materials may be utilized.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that these objects may be attained by mixing together a silicate mineral and a boron compound capable of producing boron trioxide upon heating. The mixture is fired for a time effective for the boron trioxide to substantially react with the silicate mineral. The fired mixture is thereafter leached to remove any water soluble residue and to increase the absorptive powers and surface area thereof. The temperature of firing is below the vitrification range of the silicate mineral.

More particularly, it has been found that a naturally occurring silicate mineral, e.g., zircon, the feldspars, wollastonite, petalite, etc., and particularly the hydrosilicate clays or earths, e.g., kaolin, ball clay, diatomaceous earth, attapulgite, bentonite, vermiculite, talc, asbestos, pyrophyllite and mixtures thereof, may be mixed with a boron compound, for example, boric acid, boric oxide and borates such as calcium borate and sodium metaborate, in sufficient water to produce a plastic consistency. Desirable agglomerates such as pellets, microporous membranes, spheres, microspheres and tubes may be formed of the plastic mixture and suitably dried. The formed materials are then fired at a temperature between about 600 and 1400° C., preferably between about 800 and 1300° C. for from a few minutes to 60 hours, preferably about three hours. The minimum time of firing is dependent on the mass of the shape to be fired. Microspheres, for example, may be fired in a minute or so in a fluidized bed furnace. The fired articles are leached and then dried. The resulting fired materials are strong yet exhibit a greatly increased surface area and consequent absorptive power.

While almost any naturally occurring silicate mineral may be used in this invention, it has been found that hydrosilicates having a relatively low iron content are especially desirable when the finished product is to be used as a cracking catalyst or catalyst support. For example, agglomerates of treated kaolin, asbestos and talc materials and a mixture of talc and kaolin in the form of pellets or spheres have been found to be particularly effective as catalysts in hydrocarbon conversion. However, hydrosilicates having therein larger amounts of iron are efficiently utilized in the process of this invention in the preparation of iron containing catalysts for use, for example, in automobile catalytic mufflers.

The boron compound is preferably utilized in an amount sufficient to produce the weight ratio of boron trioxide to silicate material of between about 1:30 and 1:1 and the various boron compounds may be used proportionally based on their boron trioxide content. For example, when using kaolin, the weight ratio of boric acid to the clay may range between about 1:15 and 2:1. Stated another way, the mixture may contain from about 35 to 94% kaolin and from 6 to 65% boric acid.

Mixtures containing from about 40 to 55% boric acid and from 60 to 45% kaolin present the optimum composition for a cracking catalyst. Samples of a Florida kaolin and a Georgia kaolin were each prepared in three compositions of 45, 50 and 55% kaolin with 55, 50 and 45% boric acid respectively. These compositions were mixed with water and extruded into pellets. Samples of the pellets were fired at 800, 900, 1000, 1100, 1200 and 1300° C. and were held at each temperature for 1, 3, 6 and 12 hours, resulting in 144 total samples. After firing, the samples were water leached for 24 hours and then dried. Measurements of the surface areas of a representative number of the samples ranged between 171 and 520 square meters per gram. These materials seem to be unique in that such a broad firing treatment can be used and still result in high activity.

Tests, also of a representative number of these samples, were conducted relative to their catalytic activity in the cracking of gas oil. Several samples indicated higher activities than a standard synthetic catalyst. The test was a modification of the standard "Cat-A-test": 5 ml. of gas were dripped in 10 minutes through a 25 ml. bed of the catalyst heated to a temperature of 500° F. and the products are collected as gasoline, gas-oil and gas.

After the firing step in the process, the agglomerates are leached to substantially remove unreacted boron trioxide and any other water soluble products remaining therein. The leaching liquor may conveniently be warm or hot water at temperatures generally within the range of between 50 and 100° C. and a number of successive leaching steps are usually conducted. If desired, the leaching liquor may be a solution of a mineral acid, which solution is more effective in extracting boron trioxide and additionally serves to activate the surface area of the agglomerates. When water-leached, the $Al_2O_3$ to $SiO_2$ remains as in the original silicate material while considerable $Al_2O_3$ is removed by acid-leaching. Finally, the agglomerates may for certain purposes be leached with steam at temperatures within the stability range of boric acid.

While the reasons for the substantial increase in desirable properties of the fired materials have not been precisely determined, it is believed that some type of boron silicate is formed. During firing, the boron compound is decomposed, i.e., boric acid loses water of crystallization. The resulting boron trioxide then melts and remains a liquid of high viscosity throughout the entire firing cycle specified above. This liquid permeates the voids between the silicate particles, reacts therewith to some degree and inhibits sintering of the silicate material. When a hydrosilicate is used, it also loses water of crystallization in the firing cycle. The final product shows some indistinct X-ray lines, probably forms of silica and mullite. It also contains from about 3 to 10% boron trioxide which will remain even after 72 hours leaching with hot water or after 6 hours with hot 3 N hydrochloric acid, and apparently this factor further contributes to the improved properties. The pores remaining after leaching, depending on the silicate mineral used, are of various sizes up to about 2 microns in diameter, a large number being below 100 Angstroms. It is believed the pores of smallest diameter exhibit the greatest activity.

Leaching can be carried out in an aqueous mineral acid solution utilizing hydrochloric acid, sulfuric acid, or nitric acid or mixtures thereof. Neutral water can also be employed in most cases.

Thus it is seen that materials are produced in a number of desirable useful for many and varied purposes including catalysis, for example, in a cracking reaction, as a catalyst support and as an absorbent for such liquids as radioactive liquors. In the latter instance, the treated silicate material having radioactive ions absorbed thereon may subsequently be fired to vitrification to permanently entrap the radioactive material for effective disposal.

In the following examples and throughout the specification and claims all parts and percentages are by weight unless otherwise specified.

In each of the Examples 1–3 the indicated percentages of kaolin and boric acid containing about 55% boron trioxide were thoroughly mixed and sufficient water added to produce a plastic consistency. Pellets were formed which were then fired at 800° C. for three hours. After firing the pellets were leached in hot water, changing the water three times, and then dried. After this treatment, the pellets were very strong, yet provided the surface areas indicated as determined by the Brunauer-Emmett-Teller nitrogen absorption method.

| Example | Percent Kaolin | Percent Boric Acid | Surface area, m.²/gm. |
|---|---|---|---|
| 1 | 60 | 40 | 291 |
| 2 | 70 | 30 | 140 |
| 3 | 80 | 20 | 22 |

Untreated kaolin exhibits natural surface areas in the range of from 6 to 100 m.²/gm. but this area is reduced greatly upon heating. It is apparent that the increase in surface area in the products illustrated in Examples 1–3 varies directly with the concentration of boric acid in the mixture.

*Example 4*

2.25 lbs. of Georgia kaolin and 2.75 lbs. of boric acid containing 55% boron trioxide were intimately mixed with 1.12 lbs. of water and extruded into ⅛ inch diameter rods which were cut into pellets ⅛ inch long. A portion of these pellets were dried and fired to 1100° C., holding that temperature for 12 hours. After firing, the pellets were leached with hot water for 24 hours and then dried. Surface area was then determined by nitrogen adsorption as 519 m.²/gm.

*Example 5*

2.75 lbs. of Florida kaolin and 2.25 lbs. of boric acid containing 55% boron trioxide were intimately mixed with 1.45 lbs. of water and formed into pellets as described in Example 4. A portion of these pellets were fired at 800° C., holding that temperature 12 hours, and then were leached with hot water for 24 hours and dried. Their surface area was then determined as 292 m.²/gm. In a cracking test, 61.6% conversion of gas-oil was achieved which included 29.6% by volume of gasoline and 22.6% by weight of gas.

In the following Examples 6–17, the various silicate minerals were mixed with boric acid in the percentages indicated. The mixtures were heated at the temperatures given, were thereafter leached with hot water and the final surface areas of the products are listed.

but after leaching with hot 3 normal hydrochloric acid, the surface area was 311 m.²/g. The acid leached material contained less than 0.05% CaO, however.

The above example, together with the results of Example 8 using wollastonite (calcium silicate) indicates a large increase in surface area by the process of this invention is difficult if large amounts of CaO are desired in the final product.

As indicated above, it has been discovered that the products of this invention may be leached with steam as well as with hot water to remove the soluble $B_2O_3$ remaining in the product. The steam leaching is advantageously conducted for shorter periods of time and the

| Example | Material | Surface area, m.²/g. | Mixture | | Firing Temp., °C. | Product Surface Area, m.²/g. |
|---|---|---|---|---|---|---|
| | | | Material, percent | Boric Acid, percent | | |
| 6 | Zircon | 0.8 | 70 | 30 | 1,000 | 14 |
| 7 | Feldspar | 1 | 50 | 50 | 600 | 109 |
| 8 | Wollastonite | 1.4 | 50 | 50 | 800 | 4.3 |
| 9 | Petalite | | 50 | 50 | 700 | 230 |
| 10 | Pyrophyllite | 6 | 50 | 50 | 800 | 245 |
| 11 | Georgia Kaolin | 9 (After 800° C.) | 45–55 | 55–45 | 800–1,300 | 190–576 |
| 12 | Florida Kaolin | 23 (after 800° C.) | 45–55 | 55–45 | 800–1,300 | 261–826 |
| 13 | Talc | | 50 | 50 | 800 | 305 |
| 14 | Asbestos | | 50 | 50 | 800 | 324 |
| 15 | Bentonite | | 60 | 40 | 800 | 201 |
| 16 | Ball Clay | | 60 | 40 | 800 | 261 |
| 17 | Diatomaceous Earth | | 60 | 40 | 700 | 198 |

From the above results, it is seen that the hydrosilicates are particularly suited to the process of this invention. However, surface areas are significantly increased on all silicate minerals.

The proportions of silicate mineral and boron compound may be varied to obtain a product having definite proportions therein. The reaction mixture is calculated to contain a certain percentage of $SiO_2$ and $B_2O_3$ in final product after firing but before leaching. The following examples illustrate a comparison between the calculated fired analysis and analysis after leaching and also between the results of leaching with hot water and with an acid solution.

*Example 18*

A mixture of 50% kaolin, 50% borax and sufficient water for plasticity was extruded into pellets. The pellets were dried and fired at 600° C. for 3 hours. A portion of the fired pellets was leached with hot water and after drying had a surface area of 70 m.²/g. The remaining pellets were leached with hot 3 normal hydrochloric acid. This treatment resulted in a powder which was washed with hot water, dried, and had a surface area of 129 m.²/g. The water leached pellets were analyzed, revealing that not only most of the $B_2O_3$ was removed but also some of the $Na_2O$, as compared with the calculated fired analysis. This is shown in the following table:

| | Calculated fired analysis, percent | Analysis after leaching, percent |
|---|---|---|
| $SiO_2$ | 33.1 | 47.24 |
| $Al_2O_3$, $TiO_2$, $Fe_2O_3$ | 27.9 | 38.06 |
| $Na_2O$ | 12.2 | 7.70 |
| $B_2O_3$ | 26.3 | 3.15 |

*Example 19*

250 grams of Florida kaolin was mixed with 250 grams of calcium borate frit and sufficient water and methyl cellulose for plasticity. The mixture was formed into pellets which were fired at 800° C. for 3 hours. After hot water leaching the surface area was only 0.7 m.²/g.

results compare favorably with products leached with hot water.

*Example 20*

A mixture was prepared of 50% Georgia kaolin and 50% boric acid with sufficient water to produce a plastic consistency. Pellets formed from the mixture were fired at 900° C. for six hours. The pellets were leached with steam at a temperature between 140° and 170° C. and under atmospheric pressure for seven hours. The surface area of the pellets was 396 m.²/g. which compared favorably with the surface area of 414 m.²/g. of a similar sample leached with hot water for 24 hours.

For certain well defined purposes, it may be desirable to include additional metallic oxides together with the boron trioxide in the mixture. For example, zirconium oxide or a zirconium compound capable of producing zirconium oxide may be added to the mixture of silicate mineral and boron compound. The mixture is first heated at about 800° C., then shaped into agglomerates and again fired at a more elevated temperature generally about 1200° C. Finally, the material is leached to remove water soluble products including any excess boron trioxide.

*Example 21*

40 grams of kaolin, 40 grams boric acid and 20 grams zirconium carbide 100-mesh or finer were intimately mixed and heated at 800° C. for three hours. The mixture was formed into pellets and again fired at 1200° C. for three hours. The pellets were leached in hot water and although some pellets broke into fragments during leaching, the material had a surface area of 310 square meters per gram.

The following example illustrates both the use of an additional metallic oxide in the mixture and the calculation of a mixture to produce a certain percentage of oxides in the final product after firing but before leaching.

*Example 22*

137 grams of diatomaceous earth, 241 grams of hydrated alumina and 213 grams of boric acid were mixed with enough water and methyl cellulose to produce a plastic mass. The mixture, calculated to obtain a product containing 40% $Al_2O_3$, 30% $SiO_2$ and 30% $B_2O_3$ after firing but prior to leaching, was formed into pellets and fired at 1000° C. for 3 hours. After hot water leaching, the pellets had a surface area of 275 m.$^2$/g.

In addition to the above, I have found that since many catalytic reactions are exothermic in nature, catalysts and catalyst supports having lower surface areas combined with thermal capacity for dissipating or making uniform the heat of reaction are required. Surface areas of from 20 to 60 square meters per gram are excellent for these "intermediate surface area" catalysts and catalyst carriers.

When used in the preparation of a catalyst support the mixture of boric acid and silicate material acts in the manner of a microporous bond. The ratio of boron compound and silicate material is generally similar to that utilized in preparation of the high surface area materials described above but is mixed with a larger proportion of a dense refractory material, for example, fused alumina or silicon carbide of high purity. The mixture is extruded into desired shapes, fired and leached. The resulting catalyst support of high strength may then be impregnated with a solution or slurry of any desired catalytic material and dried, heated, and/or reduced to catalytic activity.

Alternatively, the catalytic material may be incorporated in the original mixture to produce catalysts directly. Materials which may be utilized in producing either catalysts or catalyst supports include platinum, nickel, chromium, titanium, vanadium, etc., and these materials are used in amounts sufficient to produce catalytic activity.

*Example 23*

A mixture of 70% 70-mesh pure fused alumina with 15% kaolin and 15% boric acid and sufficient water for plasticity was extruded into pellets. The pellets were fired at 1000° C. for 6 hours and in another example at 1200° C. for 6 hours and finally leached with hot water. After both heat treatments, the pellets exhibited a high degree of strength and the surface area was 41 square meters per gram.

*Example 24*

A fused alumina-kaolin boric acid mixture as set forth in Example 24 was prepared incorporating additionally 0.4% platinum added as platinum tetrachloride solution containing .05 gram platinum per milliliter. Pellets of this mixture were fired at 1000° C. for 6 hours, hot water leached and dried. The surface area was 44 square meters per gram. The platinum could subsequently be reduced by hydrogen, for example to activity. The pellets produced in Example 24 were used as a reforming catalyst for the conversion of methylcyclohexane to toluene with approximately 75% conversion.

*Example 25*

Another mixture was prepared according to Example 23 incorporating additionally 6% nickelous carbonate. After firing for 6 hours at 1000° C. the pellets were hot water leached and dried, and had a surface area of 39 square meters per gram.

One important advantage of the use of steam leaching is evident in the following example:

*Example 26*

Mixture: Grams
Fused alumina (90 mesh and finer) _____ 350
Florida kaolin _____ 75
Boric acid _____ 75
Ammonium metavanadate _____ 64.3

A mixture was prepared of the above ingredients including sufficient methylcellulose solution for plasticity. The mixture was extruded into pellets which were fired at 900° C. for 6 hours. A portion of the pellets was leached with hot water and most of the vanadium was removed with the soluble boric acid. A second portion was leached with steam at 140° to 170° C. at atmospheric pressure, removing the boric acid but no vanadium. The surface area of the steam leached pellets was 11 m.$^2$/g. The pellets were strong after either hot water or steam leaching.

Examples 23–26 are of note in that varying intermediate surface areas for catalysts having thermal capacity may be prepared by adjusting the proportions of ingredients in the mixture.

I claim:

1. A method for the production of high surface area ceramics which comprises mixing together a silicate mineral with a boron compound selected from the group consisting of boric acid, boric oxide, calcium borate, and sodium tetraborate, firing the mixture at a temperature of from 600° C. to a temperature below that of complete fusion of the composition and for from about 1 to 60 hours, and leaching the fired product to substantially remove any water soluble residue, whereby the absorption and surface area of the silicate mineral are substantially increased.

2. The method according to claim 1 wherein the mixture is formed into solid agglomerates prior to firing.

3. The method according to claim 1 wherein the silicate mineral is a hydrosilicate.

4. The method according to claim 3 wherein the hydrosilicate is a member selected from the group consisting of kaolin, ball clay, attapulgite, bentonite, montmorillonite, vermiculite, talc, asbestos, pyrophyllite and mixtures thereof.

5. The method according to claim 4 wherein the mixture also contains a metallic compound capable of producing a metallic oxide selected from the group consisting of aluminum oxide and zirconium oxide upon heating.

6. The method according to claim 3 wherein the boron compound is utilized in an amount sufficient to produce a weight ratio of boron trioxide to silicate mineral of between 1:30 and 1:1.

7. The method according to claim 3 wherein the mixture is formed into solid agglomerates prior to firing.

8. A method for the production of high surface area ceramics which comprises mixing together from about 35 to 94% kaolin and from about 6 to 65% boric acid, forming the mixture into solid agglomerates, firing the agglomerates at a temperature of from about 800° C. to about 1300° C. for from about 1 to about 12 hours and leaching the agglomerates to remove the water soluble residue therein, whereby the absorption and surface area of the kaolin are substantially increased.

9. The reaction product formed from firing a mixture consisting essentially of from 40 to 80% of a silicate mineral and from 20 to 60% of a boron compound selected from the group consisting of boric acid, boric oxide, calcium borate, and sodium tetraborate, at a temperature from about 600° C. to a temperature below that of complete fusion of the mixture and for from about 1 to 60 hours and leaching the fired product to substantially remove any water soluble residue, said product having a surface area substantially greater than that of the silicate mineral.

10. The product according to claim 9 wherein the silicate mineral is a hydrosilicate selected from the group consisting of kaolin, ball clay, attapulgite, bentonite, montmorillonite, vermiculite, talc, asbestos and mixtures thereof.

11. The reaction product formed from firing a mixture consisting essentially of from 35 to 94% kaolin and from 6 to 65% boric acid, at a temperature from about 600° C. to a temperature below that of vitrification of the kaolin and leaching the fired product to substantially remove any water soluble residue, said product having a surface area substantially greater than that of the kaolin.

12. A method for the production of intermediate surface area ceramics with high thermal capacity which comprises mixing together a hydrosilicate material, a boron compound selected from the group consisting of boric acid, boric oxide, calcium borate, and sodium tetraborate and a dense refractory material, firing the mixture at a temperature below that of complete fusion of the composition and for a time effective for the boron trioxide to substantially react with the hydrosilicate material, and leaching the fired product to substantially remove any water soluble residue, whereby the absorption and surface area of the hydrosilicate material are substantially increased.

13. The method according to claim 12 wherein the mixture is formed into agglomerates and fired at a temperature of about 1000° C. to about 1200° C. for about 6 hours.

14. The method according to claim 12 wherein the mixture is formed into agglomerates prior to firing and the fired agglomerates are impregnated with a catalytic amount of a compound of an element selected from the group consisting of platinum, nickel, chromium, titanium and vanadium.

15. The method according to claim 12 wherein a catalytic amount of a compound of an element selected from the group consisting of platinum, nickel, chromium, titanium and vanadium is incorporated in the mixture prior to firing.

16. A method according to claim 1 wherein the leaching is carried out with aqueous mineral acid.

References Cited by the Examiner
UNITED STATES PATENTS

| | | | |
|---|---|---|---|
| 2,164,500 | 7/1939 | Cummins et al. | 252—432 |
| 2,230,464 | 2/1941 | Marschner | 252—432 |
| 2,339,302 | 1/1944 | Thomas et al. | 252—432 |
| 2,551,580 | 5/1951 | Bond | 252—450 XR |
| 2,938,001 | 5/1960 | De Rosset | 252—432 |
| 2,976,334 | 3/1961 | Smolin et al. | 252—432 |

OSCAR R. VERTIZ, *Primary Examiner.*

JULIUS GREENWALD, MAURICE A. BRINDISI,
*Examiners.*

N. DAVIS, R. M. DAVIDSON, E. J. MEROS,
*Assistant Examiners.*